US007580909B2

(12) United States Patent
Bollacker et al.

(10) Patent No.: US 7,580,909 B2
(45) Date of Patent: Aug. 25, 2009

(54) VISUAL REPRESENTATION TOOL FOR STRUCTURED ARGUMENTS

(75) Inventors: Kurt Bollacker, San Francisco, CA (US); Robert Cook, San Francisco, CA (US); Ken Skistimas, El Sobrante, CA (US); Tomi Pierce, San Rafael, CA (US); William Daniel Hillis, Encino, CA (US); Patrick Tufts, Berkeley, CA (US); Bran Ferren, Beverly Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 495 days.

(21) Appl. No.: 10/647,949

(22) Filed: Aug. 26, 2003

(65) Prior Publication Data

US 2005/0049986 A1 Mar. 3, 2005

(51) Int. Cl.
*G06F 17/00* (2006.01)
*G06N 5/02* (2006.01)
(52) U.S. Cl. .......................................... 706/46; 706/54
(58) Field of Classification Search .................. 706/46, 706/54
See application file for complete search history.

(56) References Cited

U.S. PATENT DOCUMENTS

| | | | |
|---|---|---|---|
| 5,774,121 A | 6/1998 | Stiegler | |
| 5,835,758 A | 11/1998 | Nochur et al. | |
| 6,076,083 A | 6/2000 | Baker | |
| 6,216,134 B1 | 4/2001 | Heckerman et al. | |
| 6,519,599 B1 | 2/2003 | Chickering et al. | |
| 6,556,960 B1 | 4/2003 | Bishop et al. | |
| 2002/0123976 A1 | 9/2002 | Baar | |

2003/0004746 A1 1/2003 Kheirolomoom et al.

FOREIGN PATENT DOCUMENTS

| | | |
|---|---|---|
| GB | 1 390 397 | 9/1975 |
| WO | WO 97/09666 | 3/1997 |
| WO | 01/40984 | 6/2001 |
| WO | WO 01/65456 A1 | 9/2001 |

(Continued)

OTHER PUBLICATIONS

Evi Chryssafidou, DIALECTIC: Enhancing essay writing skills with computer supported formulation of argumentation, 1999, Kodak/Royal Academy Educational Technology Group School of Elec. & Elec. Engineering The University of Birmingham.*

(Continued)

*Primary Examiner*—David R Vincent
*Assistant Examiner*—Nathan H Brown, Jr.
(74) *Attorney, Agent, or Firm*—Tarolli, Sundheim, Covell & Tummino LLP

(57) ABSTRACT

Systems and methods are provided for editing and displaying a structured argument. An argument model comprises a plurality of parameters associated with a structured argument. A user interface graphically displays the plurality of parameters at a user accessible display and receives input from a user defining the value of a selected parameter. A computational engine alters the selected parameter to the defined value and updates the plurality of parameters according to the defined value of the selected parameter. The altered parameters are provided to the user interface, such that the display is updated in real time to reflect the user input.

25 Claims, 12 Drawing Sheets

FOREIGN PATENT DOCUMENTS

WO      WO 02/056213 A2      7/2002

OTHER PUBLICATIONS

SYSTAT, TableCurve 2D, (http://www.systat.com/products/TableCurve2D/), 2002.*

Kevin Murphy, A Brief Introduction to Graphical Models and Bayesian Networks, 1998.*

Shijie Wang, A Prototype Belief Network-based Expert System Shell, 1990, ACM 089791-372-8/90/0007/0509.*

BryanThompson, AnnotatedHyperlbisDtd (Draft), Mar. 10, 2003.*

HALLoGRAM, Precision Tree, 2000, HALLoGRAM Publishing.*

Yoshirou Toda et al., An Argument-Based Agent System with KQML as an Agent Communication Language, 2001, PRIMA 2001, LNAI 2132, pp. 48-62, Springer-Verlag Berlin Heidelberg.*

Russell et al., "Artificial Intelligence A Modern Approach", 2003, p. 477.* van Gelder, Argument Mapping with Reason!Able, 2002.*

Lacave et al., Graphical Explanation in Bayesian Networks, 2000.*

Wang et al., Exponential growth rate of Dempster-Shafer belief functions, 1992.*

European Search Report for corresponding European application No. EP 04 25 4921 completed Mar. 21, 2005 by Examiner F. Dedek of Munich.

* cited by examiner

VISUAL REPRESENTATION TOOL FOR STRUCTURED ARGUMENTS

TECHNICAL FIELD

The present invention relates to assisted decision making applications and, more particularly, to a visual representation tool for structured arguments.

BACKGROUND OF THE INVENTION

In the past, decisions frequently had to be made on minimal amounts of available data. Information traveled slowly, and what information was available could be considered by a human mind. Frequently, the greatest problem facing a decision maker was a paucity of information. Advances in information gathering and transmittal technologies have reversed this trend, making it easier to gather large amounts of information pertaining to a particular problem. A major task facing modern day decision makers is filtering and organizing the received information into a useful form.

While automated classification and decision making systems have become increasingly sophisticated, the human mind still outperforms automated systems on most real-world tasks. A limitation of human decision making, however, is the inability of human beings to simultaneously consider a large number of factors. Decision makers often find it difficult to mentally combine large amounts evidence since the human tendency is to postpone risky decisions when data is incomplete, jump to conclusions, or refuse to consider conflicting data. Accordingly, automated methods of organizing and displaying data can greatly aid human decision makers.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later. A component as described in this application can include functionality performed by software, hardware or a combination of hardware and software.

In accordance with one aspect of the invention, a system is provided for editing and displaying a structured argument. The system includes an argument model that comprises a plurality of parameters associated with a structured argument. A user interface graphically displays the plurality of parameters at a user accessible display and receives input from a user defining the value of a selected parameter. A computational engine alters the selected parameter to the defined value and updates the plurality of parameters according to the defined value of the selected parameter. The altered parameters are provided to the user interface, such that the display is updated in real time to reflect the user input.

In accordance with another aspect of the invention, a method is provided for determining the sensitivity of a hypothesis of interest to a parameter within an argument model. A continuous mechanism is provided for a user to modify the parameter, such that the user can make multiple modifications to the parameter in rapid sequence. A confidence value associated with the hypothesis of interest is updated in response to the modification of the parameter. A display of the confidence value of the hypothesis of interest is altered in real time to match the updated confidence value in response to each modification of the parameter.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to systems and methods for representing a structured argument in a manner easily comprehensible to a human being. The present invention has broad applicability to decision making in circumstances where evidence is uncertain, incomplete, and possibly conflicting. The present invention provides a scalable graphic display illustrating a structured argument as a conclusion and one or more supporting and detracting hypotheses. The argument can be edited by a user with real time updates to the structure of the argument model and the associated probability values of the conclusion and the various hypotheses. This allows a user to immediately see the impact of any change of reasoning. The display can be scaled to a manageable level by collapsing sets of nodes within the argument structure into a single, representative node, to allow a high-level overview of the argument.

It will be appreciated that the present invention can be employed in any applications requiring structured reasoning. The systems and methods of the present invention can be applied to applications ranging from high-level government policy to procurement decisions in a small business. Thus, while the exemplary embodiments illustrated within this application focus on military and defense application, the present invention can be applied in other fields, such as industrial processes, design work, research, and corporate management.

One application of the real time updating of the argument model is sensitivity analysis. Since the displayed model is updated in real time, it is possible to adjust the confidence of a particular hypothesis and view the effect on one or more hypotheses downstream of the adjusted node. Structured arguments can comprise hundreds or even thousands of hypotheses. Thus, the ability to graphically display the effects of dynamic changes within upstream hypotheses allows a user to determine critical hypotheses within an argument. This allows the user to allocate resources effectively in gathering evidence to support these critical hypotheses.

Figure 1:
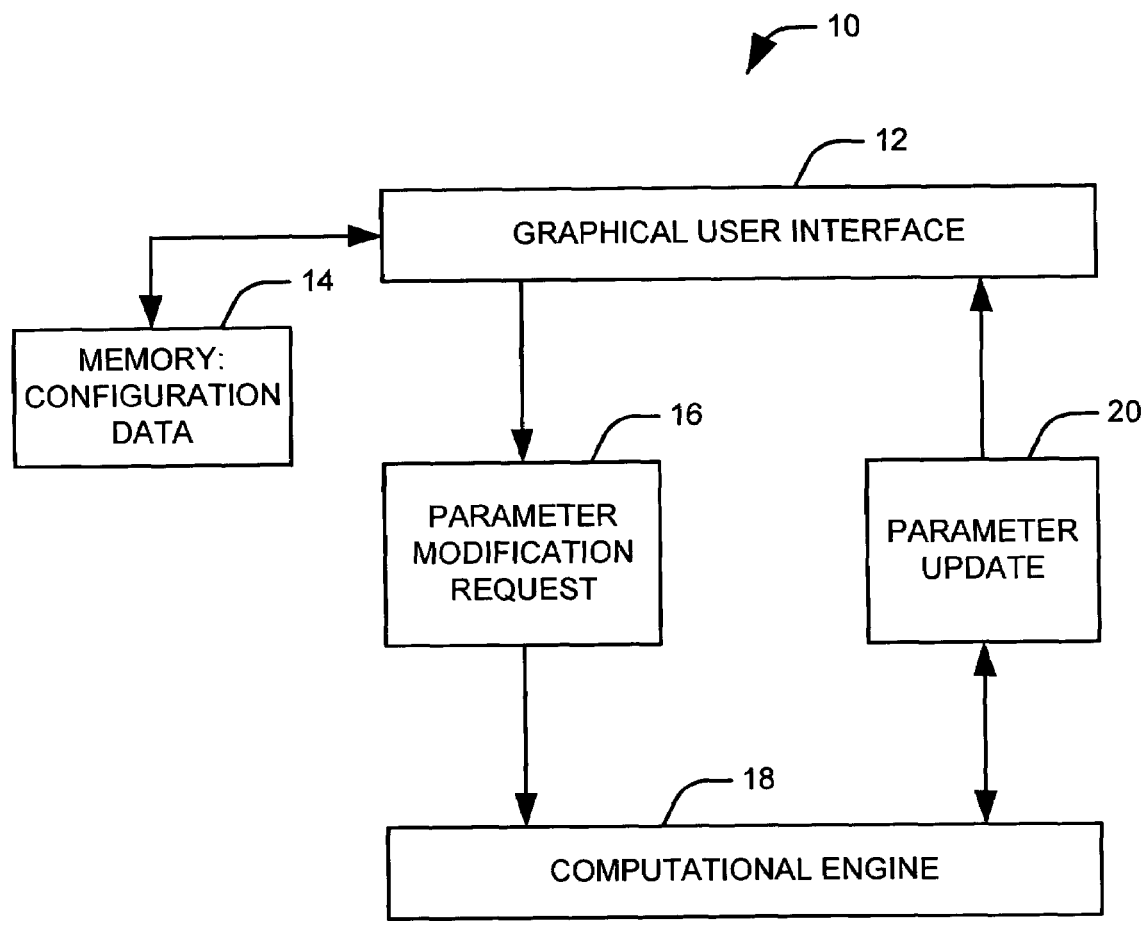
FIG. 1 illustrates a block diagram of a system for editing and displaying a structured argument in accordance with an aspect of the present invention.

FIG. 1 illustrates a system 10 for editing a representation of a structured argument, referred to as an argument model, and displaying the results in real time. A graphical user interface 12 displays a representation of a structured argument to a user. The structured argument can be displayed in any fashion easily comprehensible to a user, but in an exemplary embodiment, the structured argument is displayed as a belief network. The structured argument contains a main hypothesis, the hypothesis of interest, and a plurality of contributing hypotheses.

In an exemplary embodiment, the argument model can represent a belief network, such as a Bayesian belief network, a Dempster-Shaffer belief network, a neural network, or the like. Accordingly, the graphic user interface can display the argument model in a like fashion as a plurality of nodes. Each node represents a hypothesis from the structured argument. Belief networks are hierarchical, such that one or more contributing hypotheses, represented by upstream nodes, contribute to the verification of one or more other hypotheses downstream. The nodes are linked together by connectors to indicate a logical relationship between the nodes. In most applications, structured arguments concentrate on verifying or refuting only the main hypothesis, with information in supporting hypotheses considered solely for the information they provide concerning the main hypothesis. Thus, the logical relationships are considered only in one direction, with each connector linking a contributing node with a node higher in the hierarchy. By convention, the contributing node within a linked pair of nodes is called a parent node, and the node it contributes to is called a child node. These terms can also be used to describe the hypotheses represented by the nodes, such that parent hypotheses directly contribute to a child hypothesis.

Each hypothesis within the structured argument is associated with one or more parameters. For example, the hypothesis can have an associated confidence value reflecting a likelihood that the hypothesis is true. Similarly, the logical relationships between the hypotheses, as represented by the connectors, can have associated parameters, referred to as influence values. In an exemplary embodiment, the confidence value of each hypothesis, including the main hypothesis, is a function of the confidence values of its associated parent nodes and the influence values associated with their respective logical connections to the child node. The exact function can vary with the application.

For example, a child hypothesis can have a plurality of parent hypotheses, each having a logical relationship to the child hypothesis. These logical relationships can be quantified by the user as an influence value associated with a connection between a node representing the child hypothesis and respective nodes representing the parent hypotheses. Each of the parent hypotheses can also have an associated confidence value. In an exemplary embodiment, the confidence value of the child hypothesis is equal to an average or sum of the confidence values of the parent hypotheses weighted by their respective influence values. It will be appreciated, however, that the function relating the confidence values of the parent and child hypotheses can be any suitable mathematical function, including functions derived from Bayesian statistical theory.

The graphic user interface 12 displays the network as a plurality of nodes, each having a qualitative and a quantitative display of their confidence value. The qualitative display can include one or more features of the node that can be varied to represent a range of confidence values. Exemplary features include the size, hue, brightness, saturation of the node or of its boundary lines, and the shape of the node. It will be appreciated, however, that this list is non-exhaustive. The quantitative value can be any appropriate numerical indicator of the confidence value. In an exemplary embodiment, this can include a numerical value accompanied by a line graph showing the position of the numerical value on a scale of minimum and maximum confidence.

The nodes are connected by connectors representing the logical relationships between the nodes. The influence values associated with the connectors can be indicated by both a qualitative display and a quantitative display. The qualitative display can include one or more features of the node that can be varied to represent a range of influence values. Exemplary features include the thickness, length, hue, brightness, and saturation of the connector. The quantitative value can be any appropriate numerical indicator of the influence value. In an exemplary embodiment, this can include a numerical value accompanied by a line graph showing the position of the numerical value on a scale of minimum and maximum influence.

The display of the nodes is governed by configuration data 14 provided by a user. For example, the configuration data 14 can define one or more features of the display, such as one or more colors used to display nodes and connectors, line thickness, and text font. The configuration data 14 can further include instructions on how to display information, such as instructions to not display quantitative information at the nodes or connectors, instructions on how to display changes to the network, and default values for newly created nodes and connectors.

The graphical user interface 12 is also operative to receive input from a user. For example, the graphical user interface 12 can include one or more menu options to allow the user to alter the configuration data 14 associated with the display. Further, the graphic user interface 12 can accept input requesting the modification of one or more parameters associated with the nodes or the confidence values. The modification can include adding a node or connector, deleting a node or connector, or modifying a parameter associated with an existing node or connector. For example, a user might request that a confidence value associated with one of the nodes be changed. In an exemplary embodiment, this can be accomplished by moving a slider associated with one of the nodes.

The parameter modification request 16 is provided to a computational engine 18. The computational engine 18 updates one or more parameters associated with the structured argument in response to the modification request 16. For example, if the modified parameter is a confidence value associated with one node, the altered confidence value is altered in a system memory (not shown). It is also desirable, however, to change the associated confidence values of any child nodes of the altered node, as their confidence values depend upon the confidence value of the altered node. It is further desirable to change the values of any nodes depending from the child nodes, and so on, such that the change to a single node propagates downstream all the way to the node associated with the main hypothesis.

A similar process occurs when the modified parameter is an influence value of a connector associated with a parent node and a child node. The change to the influence value changes the associated confidence value of the child node. The new confidence value associated with the child node affects the confidence value of each downstream node. Accordingly, it can be desirable, in accordance with an aspect of the present invention, to modify a large proportion of the parameters belief network in response to the modification of a single parameter by the user.

The updated parameter values are provided to the graphical user interface 12 as a parameter update 20. The graphical user interface 12 updates the values of the parameters on the screen to reflect the modified parameter as well as the modifications to the parameters dependent on the modified parameter. These modifications can include changing both the qualitative and quantitative displays of parameters associated with a node or connector. It will be appreciated that these updates are calculated at the computational engine 18 and provided to the graphical user interface 12 at a high rate of speed. Thus, the display can be modified by the graphical user interface 12 in real time to immediately show the user the results of the modifications. This allows a user to determine the sensitivity of the main hypothesis to any contributing hypothesis in the argument by viewing the result of hypothetical values of parameters associated with the contributing hypothesis.

Figure 2:
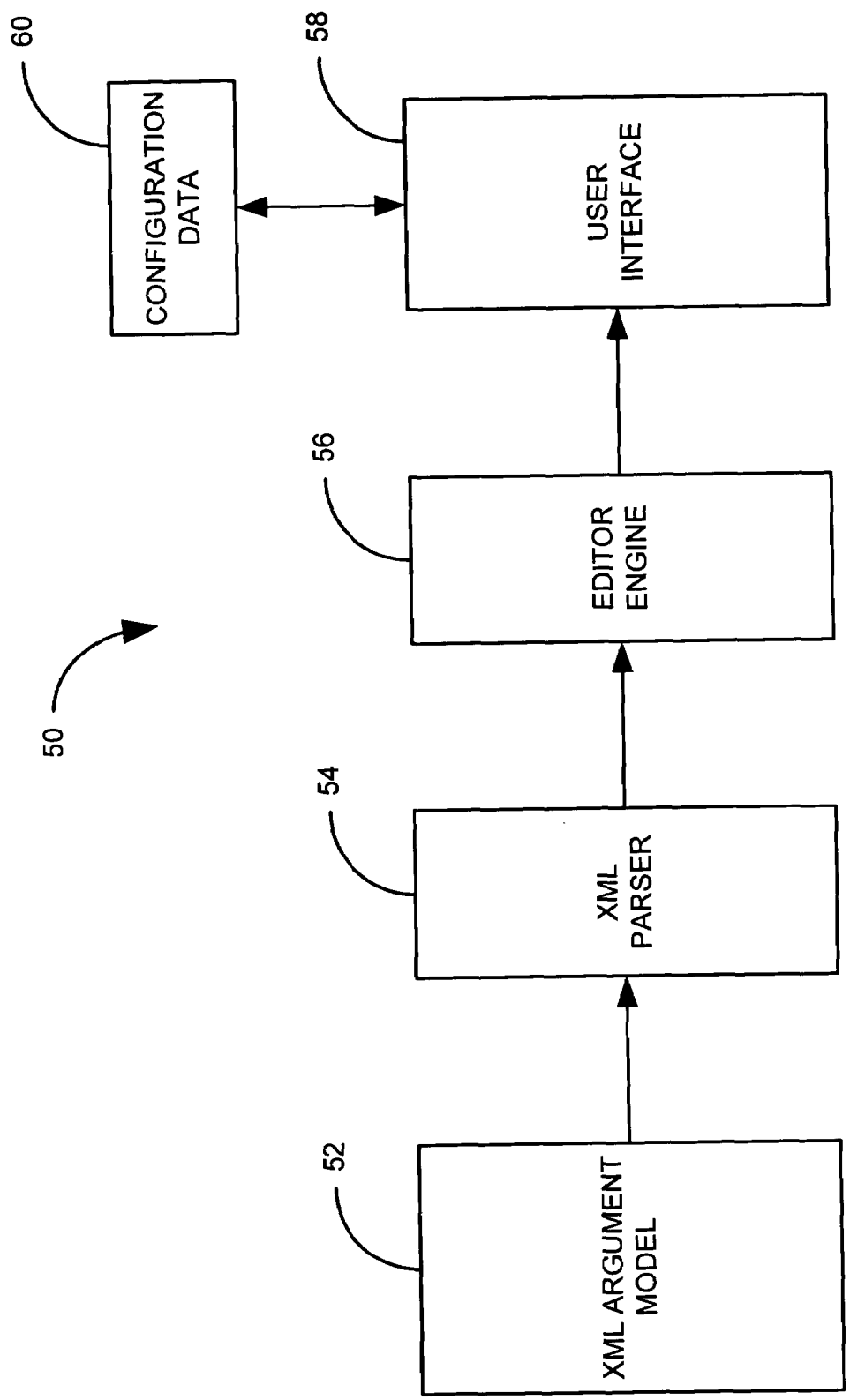
FIG. 2 illustrates a schematic block diagram of an exemplary system for providing argument model data to a structured argument editor in accordance with one or more aspects of the present invention.

FIG. 2 illustrates an exemplary system 50 for providing argument model data to a structured argument editor in accordance with one or more aspects of the present invention. The illustrated system 50 can be used both for loading a file saved by a current user or for incorporating a subargument into an existing argument. Many decision making tasks require the joint efforts of a large number of people. Often, the evaluation of a particular contributing hypothesis can be assigned to individuals other than the user maintaining the main argument model. The illustrated system 50 allows the work of these other individuals to be incorporated into the main argument, preserving the full reasoning of the subargument without extensive data entry.

In the illustrated implementation, an argument model 52 is saved as a XML (Extensible Markup Language) schema. The XML argument model can be a subargument associated with a main argument model. The XML argument model is provided to an XML parser 54 that extracts the argument data from the XML file. The extracted data is then provided to an editor engine 56 that processes the data and incorporates it into the main argument model. In an exemplary embodiment, a node representing the contributing hypothesis of interest can already be present in the main argument model. The extracted data is appended to the existing node as a hierarchy of parent nodes. It will be appreciated that this addition can involve the recalculation of not only the node representing the hypothesis of interest, but one or more confidence values associated with downstream nodes as well.

The editor engine 56 produces updated values for one or more parameters within the main argument. A user interface 58 updates a node associated with the hypothesis of interest on a user display in accordance with saved configuration data 60 to reflect the new parameter values and to include the new nodes and connections from the subargument. The configuration data can reflect a preferred color scheme or display format for the main argument model. In an exemplary embodiment, the configuration data can direct the new nodes and connections from the subargument to be provided in a collapsed (e.g., hidden) form to prevent unnecessary cluttering of the main argument. An expansion icon can be appended to the node representing the hypothesis of interest to allow the subargument to be viewed. The user interface also updates one or more displayed qualitative and quantitative features associated with nodes downstream of the hypothesis of interest to reflect the new data.

Figure 3:
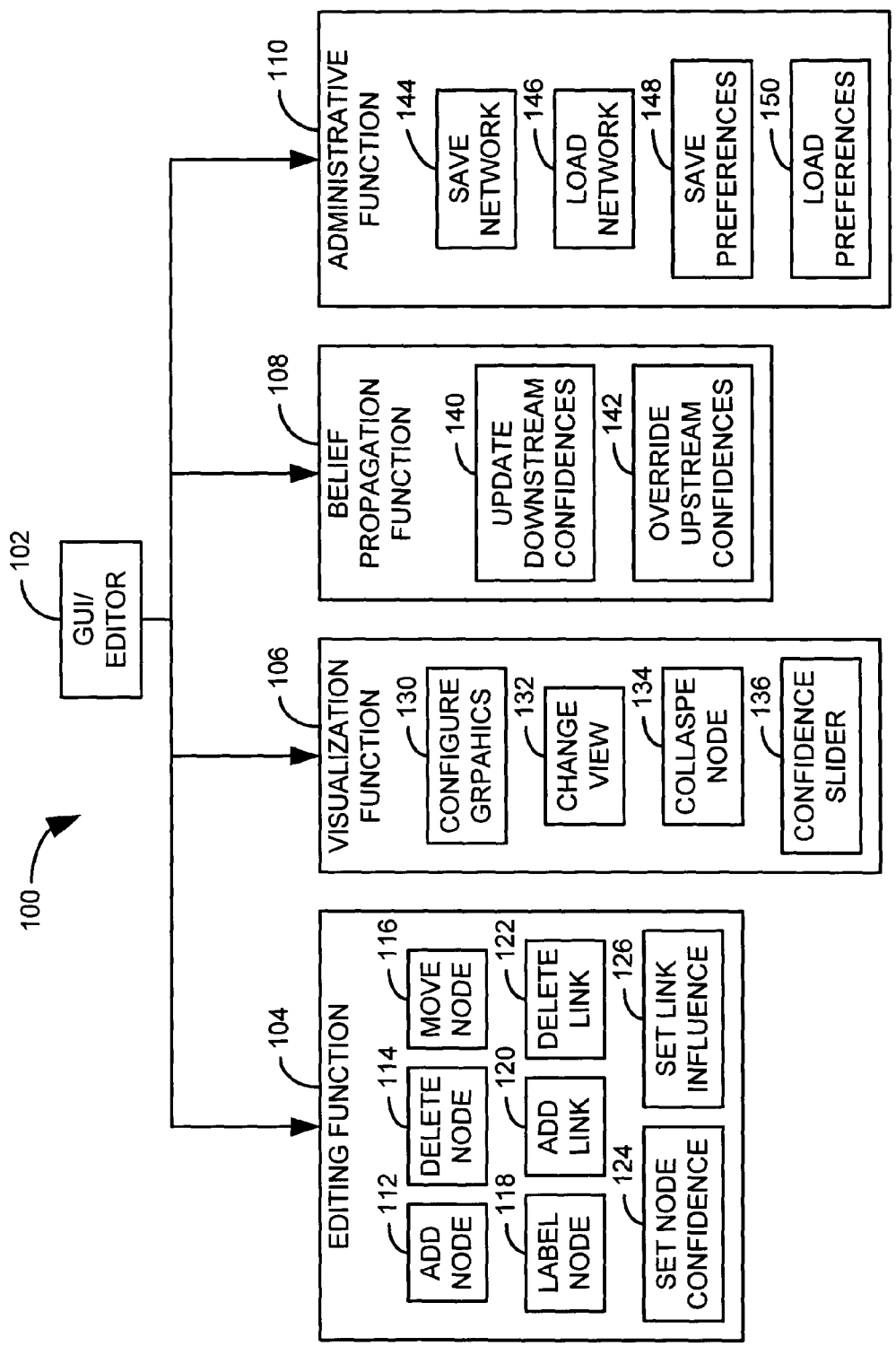
FIG. 3 illustrates a functional block diagram of an exemplary system for displaying and editing a structured argument in accordance with the present invention.

FIG. 3 illustrates a functional block diagram of an exemplary system 100 for displaying and editing a structured argument in accordance with the present invention. The system 100 includes an graphical user interface (GUI)/editor 102 that allows a user to view and edit a structure argument. The GUI/editor 102 has four associated high-level functions, an editing function 104, a visualization function 106, a belief propagation function 108, and an administrative function 110.

The editing function 104 comprises a plurality of subfunctions that allow a user to build and edit a structured argument. For example, several functions allow the user to manipulate the various nodes within the argument model. An add node function 112 allows a user to add a node to an existing argument. A delete node function 114 allows a user to delete an existing node. A move node function 116 allows nodes to be moved while maintaining their current connections. A label node function 118 allows a label, generally identifying the hypothesis associated with the node, to be added to a node within the argument.

Other sub-functions within the editing function 104 allow the user to manipulate the logical connections between nodes. An add link function 120 allows the user to add a connection between two nodes. A delete link function 122 allows the user to delete a connection between two nodes. Additionally, the move node function 116 allows for the rerouting of the various connectors connected to a node as the node is moved. Still other sub-functions within the editing function 104 allow for the modification of parameters within the argument. For example, a set node confidence function 124 allows the user to specify a confidence value for a particular node. Similarly, a set link influence function 126 allows the user to change the influence value of a particular connector.

The visualization function 106 controls the display of the information within the argument model to the user. A graphic configuration sub-function 130 allows the user to specify display preferences for the editor interface 102. For example, the user can specify the colors associated with the nodes and connectors within the argument model. A change view sub-function 132 allows the user to select a zoom level or a portion of the argument model for viewing. A collapse node sub-function 134 allows the user to hide one or more of nodes and connectors downstream of a particular node to simplify the display of the argument model. The sub-function 134 also allows the argument to be reexpanded upon a command from the user. Finally, a confidence slider sub-function 136 allows a user to display a confidence value or an influence value as a line graph scale, ranging from a minimum value to a maximum value. This allows the user to more easily visualize the range of available values when editing these parameters.

The belief propagation function 108 controls the propagation of the effects of modified parameters through a structured argument. For example, an update function 140 updates parameters downstream of a modified parameter to reflect the new value. For example, a changed influence value or confidence value can alter the confidence values of nodes downstream of the change. On occasion, however, it can be desirable to change a downstream node without disturbing the upstream nodes contributing to that node. For example, it may be desirable to determine the sensitivity of the main hypothesis to a hypothesis represented by a particular node. In this case, an override function 142 overrides the effects of the nodes contributing to a node of interest and allows the user to directly modify its associated confidence value.

The administrative function 110 allows a user to manage data generated with the GUI/editor 102. For example, a save network function 144 allows a user to save a generated network as a file. A load network function 146 allows a user to load an existing file representing an argument model into the GUI/editor 102. A save preferences function 148 allows the user to save one or more display preferences as configuration data. For example, a preferred color scheme for the editor display can be saved with this function. Conversely, a load preferences function 150 allows the user to load saved configuration data into the GUI/editor 102. It will be appreciated that the listed functions associated with the GUI/editor 102 is solely exemplary and should be considered neither exhaustive nor necessary for the practice of the present invention.

Figure 4:
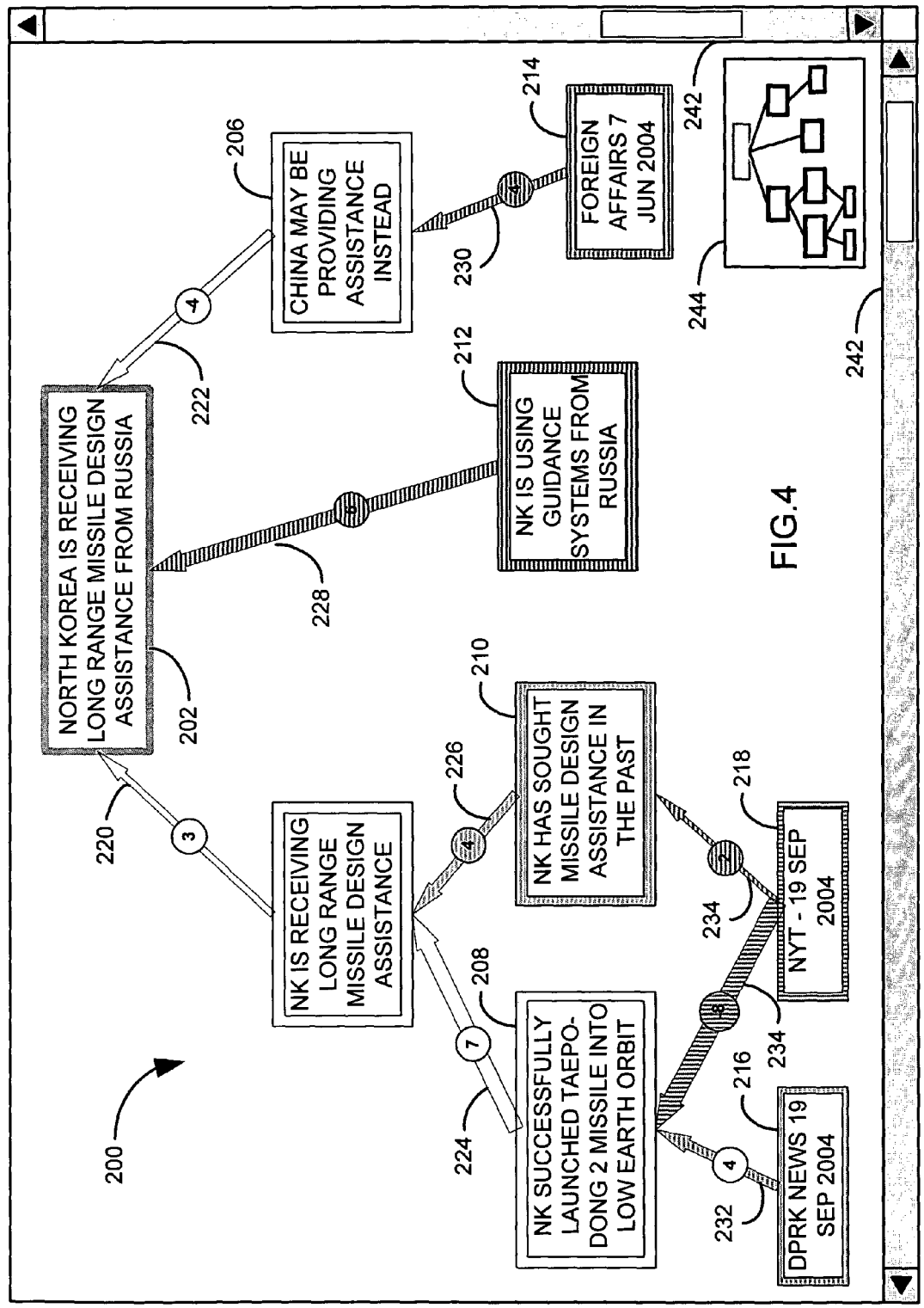
FIG. 4 illustrates a display from an exemplary structure argument editor in accordance with one or more aspects of the present invention showing a main screen view of a structured argument.

FIG. 4 illustrates a display 200 from an exemplary structured argument editor in accordance with one or more aspects of the present invention showing a main screen view of a structured argument. The display illustrates a plurality of nodes 202-218, including a main node 202 and one or more contributing nodes (e.g., 204-218). Each of the nodes is associated with one of the hypotheses in the argument, with the main node being associated with the main hypothesis. The nodes are interconnected by one or more connectors (e.g., 220-236).

The contributing nodes (e.g., 204-218) can be divided into three basic groups according to the influence values of their connections to their respective child nodes. The first group comprises supporting nodes, which, overall, increase the confidence values of its child nodes as its confidence value increases. In an exemplary embodiment, this simply means that the sum of the influence values of the downstream connections of a supporting node is positive. In the illustrated implementation, supporting nodes are a first color, such as blue.

The second group of contributing nodes comprises detracting nodes, which, overall, detract from the confidence values of its child nodes as its confidence value increases. In an exemplary embodiment, this simply means that the sum of the influence values of the downstream connections of a detracting node is negative. In the illustrated implementation, detracting nodes are a second color, such as red. The third group of contributing nodes comprises neutral nodes, which, overall, have a balanced effect on the confidence values of its child nodes. In an exemplary embodiment, this simply means that the sum of the influence values of the downstream connections of a detracting node is equal to zero. In the illustrated implementation, neutral nodes are a third color, such as gray. The main node, as it has no child nodes, is also depicted in the third color.

In the illustrated implementation, the confidence value associated with each node is shown by the saturation of the color of the node, such that nodes having a high confidence value have a high saturation and nodes having a low confidence value have a low saturation values, appearing faded. As a user changes the confidence value associated with a node, the color saturation of the node and any affected downstream nodes can be altered in real time to qualitatively show updated confidence values for the node. By observing one or more nodes for changes in saturation, a user can determine the sensitivity of those nodes to the modified parameter, allowing for refinement of the structure argument.

The connectors (e.g., 220-236) can be displayed as to give similar qualitative information concerning the influence value of the connector. For example, the thickness of a particular connector can vary with the magnitude of the influence value associated with the connector. Thus, connectors representing a strong logical relationship between hypotheses can be represented as thick lines and connectors reflecting a more tenuous relationship as thinner lines. The sign of the influence value can be shown by color, with connectors having positive influence values being shown in a first color, and connectors having negative influence values being shown in a second color. Connectors having an influence of zero are shown as thin lines in a third color. In the illustrated implementation, each of the connectors can also vary in saturation, according to the confidence value of the parent node in the connection.

The display 200 also shows a menu bar 240 at which a plurality of pull-down menus can be selected. For example, a file menu can allow the user access to one or more administrative features, such as saving or loading argument,models. The display 200 further illustrates a pair of scroll bars 242 for changing the screen view to other portions of a argument model. A navigator window 244 is provided to facilitate navigation through the argument model. The navigator window 244 is a miniature overview of the entire argument model. By clicking on a portion of the navigator window 244 with an input device, the user can select that portion of the argument model for viewing. A useful argument model can be very large, comprising hundreds or thousands of individual nodes. The navigator window 244 allows a user to maintain a broad view of the argument model and allows the user to quickly focus on any desired portion of the argument model.

Figure 5:
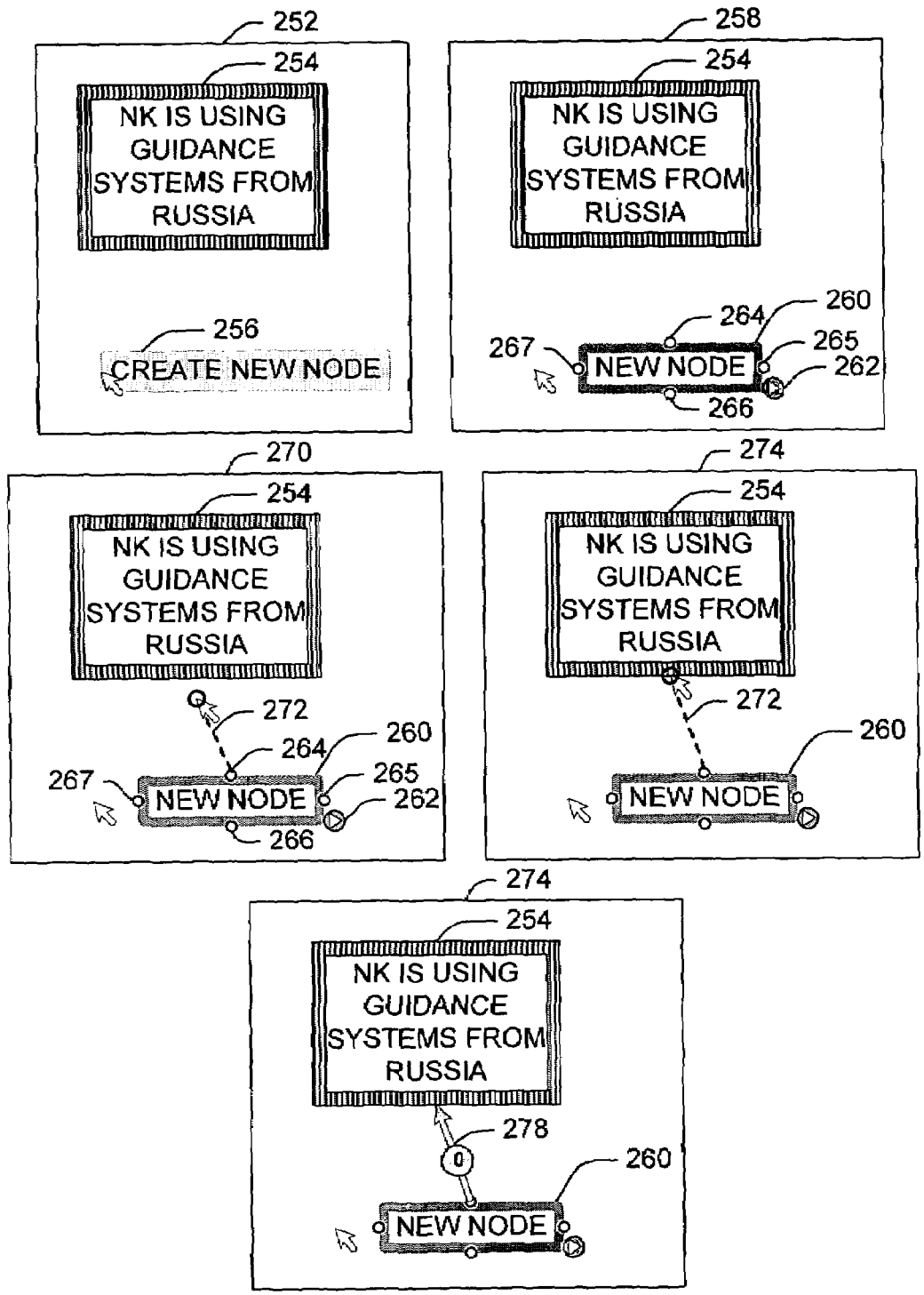
FIG. 5 illustrates a sequence of panels from a display in an exemplary structured network editor in accordance with one or more aspects of the present invention showing the addition of a node to a structured argument.

FIG. 5 illustrates a sequence 250 of panels from a display in an exemplary structured argument model editor in accordance with one or more aspects of the present invention showing the addition of a node to a structured argument. The panels are intended to show a progression of time beginning with a first panel 252. The first panel 252 shows a first node 254. Beneath the first node, a right click menu 256 displays an option to create a new node. It will be appreciated that new nodes can be generated by other means, such as options located on a menu bar (not shown) or one or more "drag and drop" templates (not shown). In a second panel 258, a new node 260 has been created in place of the right-click menu 256. The new node 260 includes a slider icon 262 that can be used to call a slider for setting a confidence value associated with the new node 260. The new node 260 also includes one or more connection points (e.g., 264-267) for making connections between nodes.

In a third panel 270, a user has extended a proposed connection 272 from one of the connection points 264. In a fourth panel 274, the user extends the proposed connection to 272 the first node 254. In a fifth panel 276, the proposed connection 272 becomes a connector 278. The connector 278 comprises an arrow connection between the new node 260 and the first node 252. A numerical indicator 280 within the connector 278 gives an influence value associated with the connector. For a new connector (e.g., 278), the influence value begins at zero, but his can be altered by a user in accordance with one or more aspects of the present invention.

Figure 6:
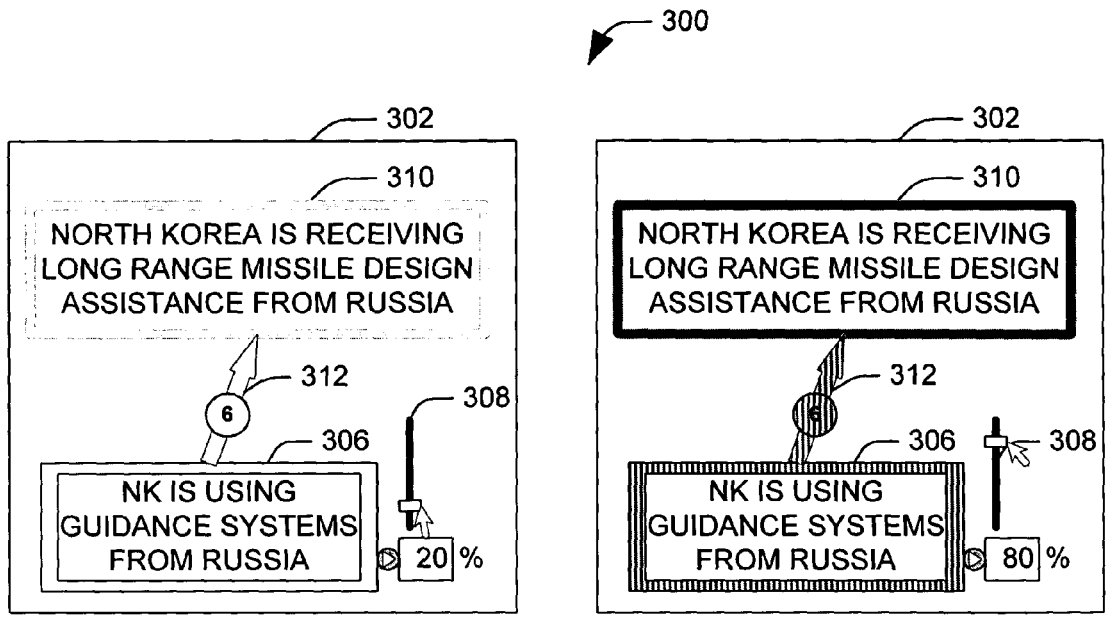
FIG. 6 illustrates a sequence of panels from a display in an exemplary structured network editor in accordance with one or more aspects of the present invention showing the modification of a confidence value of a node within a structured argument.

FIG. 6 illustrates a sequence 300 of panels from a display in an exemplary structured argument model editor in accordance with one or more aspects of the present invention showing the modification of a confidence value of a node within a structured argument. The panels are intended to show a progression of time beginning with a first panel 302 and proceeding to a second panel 304. In the first panel 302, a first node 306 is set of a confidence value of twenty percent at an associated first slider 308. The first node is connected to a second node 310, a child node of the first node 306, by a connector 312. The connector 312 has a positive influence value, such that the first node is a supporting node of the second node.

In the second panel 304, the slider 308 has been moved to change the confidence value of the first node 306 to eighty percent. The saturation of the color within the border of the first node 306 and within the connector 312 has increased to reflect the increased confidence value of the first node. As will be appreciated, the first node 306 is a supporting node of the second node 310, such that the confidence value of the second node depends on the confidence value of the first node. Thus, the saturation of the second node 310 also increases to reflect an increased confidence value. It will be appreciated that these changes occur in-real time as the slider 308 is moved.

Figure 7:
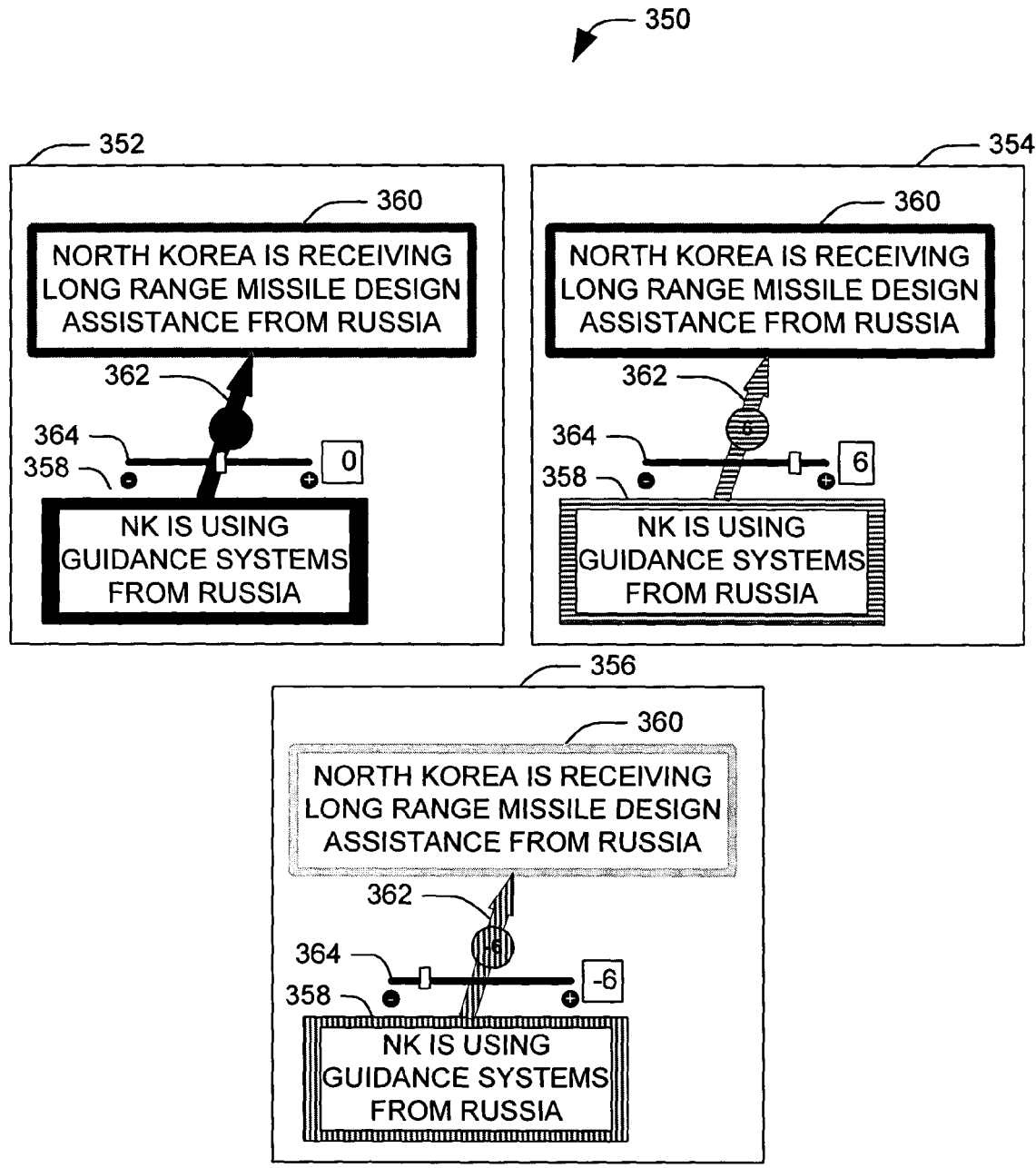
FIG. 7 illustrates a sequence of panels from a display in an exemplary structured network editor in accordance with one or more aspects of the present invention showing the modification of an influence value of a connector within a structured argument.

FIG. 7 illustrates a sequence 350 of panels from a display in an exemplary structured argument model editor in accordance with one or more aspects of the present invention showing the modification of an influence value of a connector within a structured argument. The panels are intended to show a progression of time beginning with a first panel 352 and proceeding through a second panel 354 and a third panel 356. In the first panel 352, a first node 358 and a second node 360 are connected by a connector 362. The first node 358 is a parent node of the second node 360. In the first panel 352, the connector 362 has an influence value of zero, such that the first node 358 is a neutral node with respect to the second node 360. Both the node and the connector are a "neutral" third color in accordance with one or more aspects of the present invention. The influence value of the connector 362 is indicated by a slider 364, which can be manipulated by a user to change the influence value.

In the second panel 354, the slider 364 has been moved to change the influence value of the connector 362 to positive six. The width of the connector 362 has changed accordingly to reflect the change in the magnitude of the influence value. Also the color (e.g., hue) within the border of the first node 358 and within the connector 362 has changed to a "supporting" first color to reflect the fact that the first node 358 is now a supporting node of the second node 360. As the second node 360 is now supported by the first node 358, a positive contribution from the first node is added to the confidence value of the second node. Thus, the saturation of the second node 360 increases to reflect an increased confidence value. It will be appreciated that these changes occur in real time as the slider 364 is moved.

In the third panel 356, the slider 364 has been moved to change the influence value of the connector 362 to negative six. The width of the connector 362 does not change as the magnitude of the influence value has not changed. The hue of the border of the first node 358 and within the connector 362 has changed to a "detracting" second color to reflect the fact that the first node 358 is now a detracting node of the second node 360. As the second node 360 is no longer supported by the first node 358, and is in fact refuted or detracted by it, the positive contribution seen in the second panel 354 is lost and a negative contribution from the first node is added to the confidence value of the second node. Thus, the saturation of the second node 360 decreases sharply to reflect a decrease in its confidence value. Again, it will be appreciated that these changes occur in real time as the slider 364 is moved.

Figure 8:
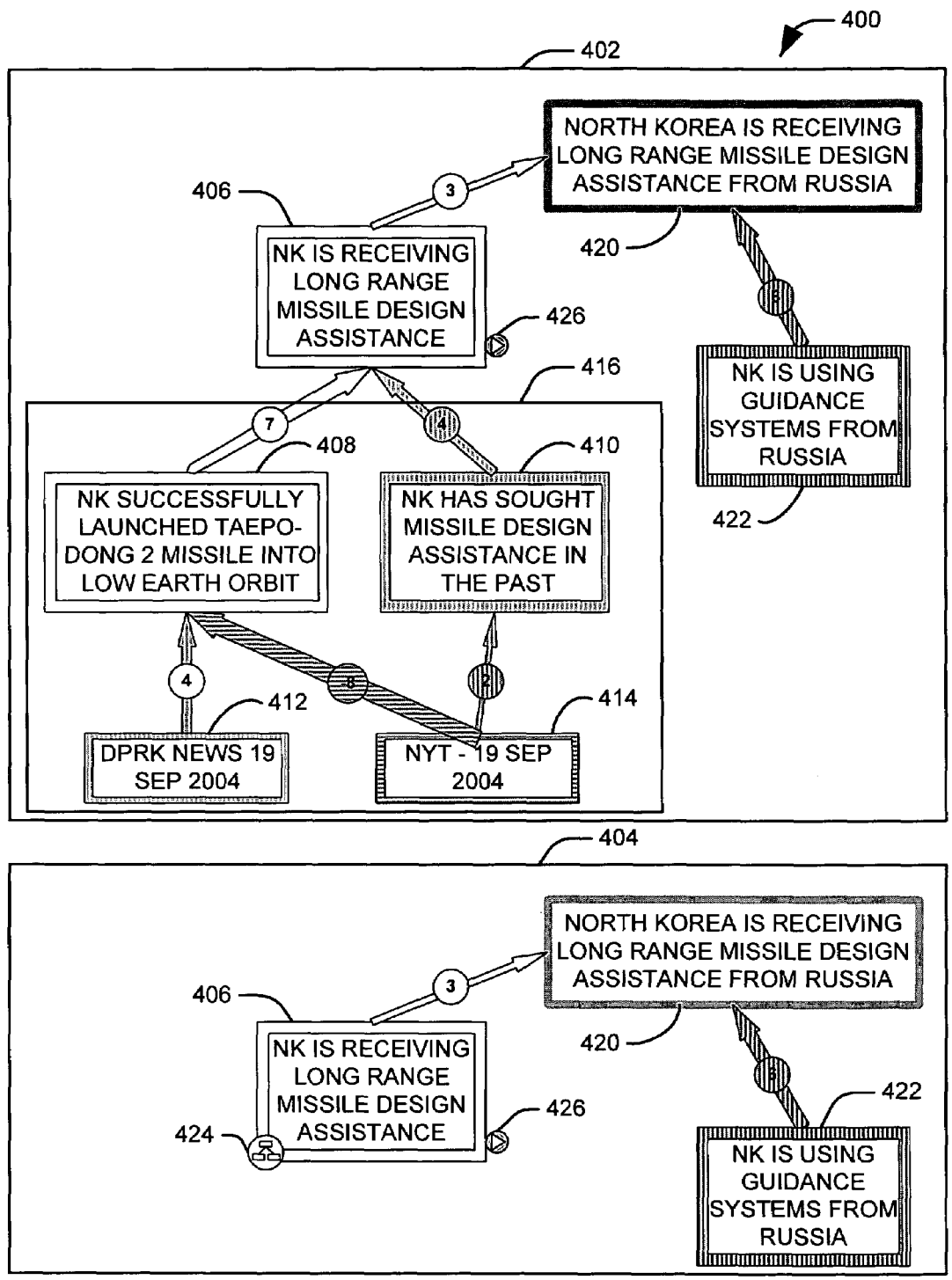
FIG. 8 illustrates a sequence of panels from a display in an exemplary structured network editor in accordance with one or more aspects of the present invention showing the collapsing of a subargument into a child node within a structured argument.

FIG. 8 illustrates a sequence 400 of panels from a display in an exemplary structured argument model editor in accordance with one or more aspects of the present invention showing the collapsing of a subargument into a child node within a structured argument. The panels are intended to show a progression of time beginning with a first panel 402 and proceeding to a second panel 404. In the first panel, a first node 406 has a one or more contributing nodes (e.g., 408-414). These contributing nodes (e.g., 408-414) comprise a subargument 416 contributing to the confidence value of the first node 406.

It will be appreciated that human beings can only process a limited amount of information at any one time. The complexity of a real-world structured argument can be too much for a user to comprehend in its fully expanded form. Accordingly, the display structured argument is made scalable, such that portions of the argument unnecessary for grasping a particular point within the argument can be ignored until needed. In the illustrated example, a main node 420 has two direct parent nodes, the first node 406 and a second node 422. To describe the structured argument at a high level to an individual unfamiliar with it, it might be desirable to limit the scope of the discussion to the two top-level contributing nodes 406 and 422.

In accordance with one or more aspects of the present invention, the subargument 416 can be collapsed into the first node 406. This is illustrated in the second panel 404, where an expand argument icon 424 has replaced all of the first node's 406 connections to its parent nodes (e.g., 408 and 410). It will be appreciated that the data influencing the first node 406 has not been lost. The confidence value of the first node 406 remains a function of the confidence values of the various nodes 408-414 comprising the subargument 416. If desired, for example, to demonstrate the sensitivity of an argument, the user can override the input of the hidden subargument 416 via a slider icon 426 on the first node. It will be appreciated that this scalability allows the user to present the modeled argument in a structured manner to a third party without the need to explore all of the hundreds of factors comprising the argument.

Figure 9:
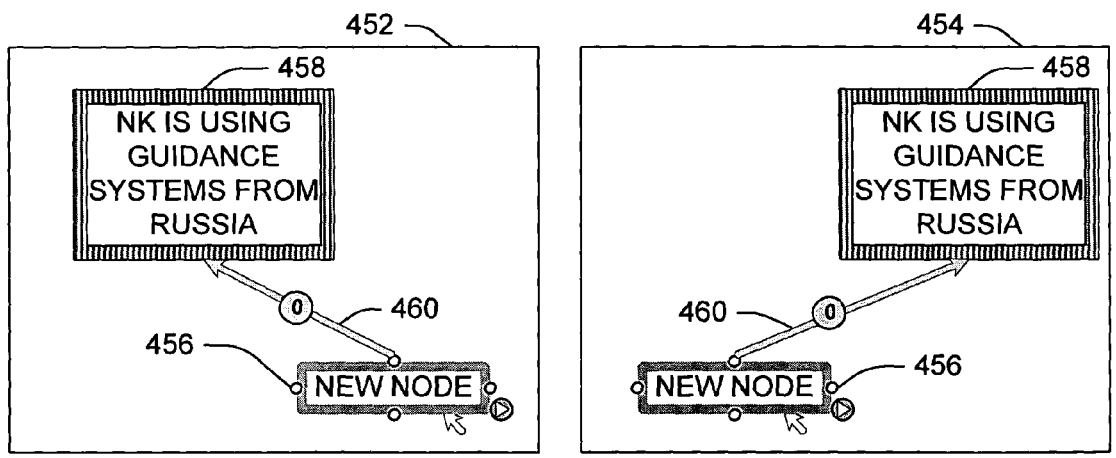
FIG. 9 illustrates a sequence of panels from a display in an exemplary structured network editor in accordance with one or more aspects of the present invention showing the adjustment of the position of a node within a structured argument.

FIG. 9 illustrates a sequence 450 of panels from a display in an exemplary structured argument model editor in accordance with one or more aspects of the present invention showing the adjustment of the position of a node within a structured argument. The panels are intended to show a progression of time beginning with a first panel 452 and proceeding to a second panel 454. The first panel 452 illustrates a first node 456 connected to a second node 458 by a connector 460. In the second panel 454, a user has selected the first node 456 with an input device and moved the first node to a new location within the structured argument without disturbing the connection with the second node 458. It will be appreciated that this is helpful in organizing a structured argument for presentation to another. For example, a plurality of hypothesis within the argument can be organized from left to right in a logical order for presentation.

Figures 10, 11:
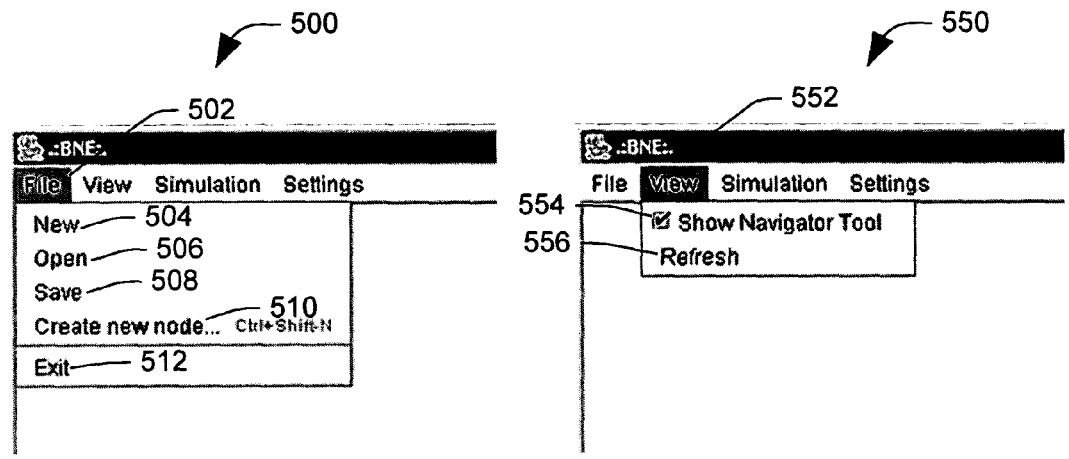
FIG. 10 illustrates a menu bar displayed within an exemplary structured argument editor having a first option selected in accordance with one or more aspects of the present invention.
FIG. 11 illustrates a menu bar displayed within an exemplary structured argument editor having a second option selected in accordance with one or more aspects of the present invention.

FIG. 10 illustrates a menu bar 500 from an exemplary structured argument editor having a first option 502 selected in accordance with one or more aspects of the present invention. In the illustrated implementation, the first option 502 is a drop-down file menu having one or more administrative functions. The user can highlight an option on the drop-down menu to access one of the administrative functions. For example, a "New" option 504, when selected, opens a new editor session for the user to model a structured argument. Similarly, an "Open" option 506 opens a file selection screen (not shown) that allows the user to select a file containing an existing argument model. In an exemplary embodiment, the file can be in an XML formal.

A "Save" option 508 allows the user to save the presently displayed argument as a file, such as an XML file. A "Create new node" option 510 allows the user to add a new node to the presently displayed argument. The process of adding a node to an argument is discussed more thoroughly above in respect to FIG. 5. Finally, an "Exit" option 512 allows the user to exit the structured argument editor program.

FIG. 11 illustrates a menu bar 550 from an exemplary structured argument editor having a second option selected in accordance with one or more aspects of the present invention. In the illustrated implementation, the second option 552 is a drop-down view menu having one or more display functions. The user can highlight an option on the drop-down menu to access one of the display functions. A first drop-down menu option 554 allows the user to select whether or not to display a navigator window tool on the main screen. The navigator window is a small overview of the structured argument model that allows the user to select a portion of the argument model to view. Selecting the menu option toggles the navigator from an "On" mode to an "Off" mode. A second drop-down menu option 556 allows the user to refresh the main screen to display the present state of the argument model. It will be appreciated that the argument model updates in real time, such that the refresh command will rarely be needed.

Figures 12, 13:
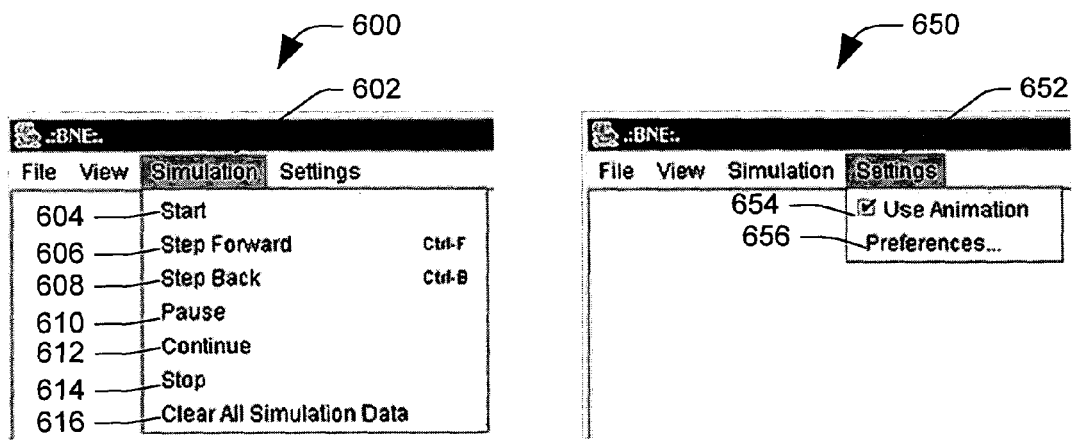
FIG. 12 illustrates a menu bar displayed within an exemplary structured argument editor having a third option selected in accordance with one or more aspects of the present invention.
FIG. 13 illustrates a menu bar displayed within an exemplary structured argument editor having a fourth option selected in accordance with one or more aspects of the present invention.

FIG. 12 illustrates a menu bar 600 from an exemplary structured argument editor having a third option selected in accordance with one or more aspects of the present invention. In the illustrated implementation, the third option 602 is a drop-down simulation menu having one or more simulation functions. The simulation functions allow a user to write a plurality of simulation values for one or more parameters within the structured argument model into a file as a time progression. The simulation functions process and report the effect of the various simulation values on one or more parameters of interest within the argument model.

A first option in the simulation menu is a start command 604. Upon selecting the start command, a user can be prompted to select a file containing simulation data. Once the file is selected, a first state, comprising simulation values for one or more parameters within the argument, is loaded into memory. The simulation function then updates the other parameters within the structured argument to match the simulation parameters. This process occurs as discrete states, each state having a predetermined delay, such that a user can observe the effects of each state on the argument. The effects of the simulation on one or more parameters can also be recorded as a separate file for later review. The effect of the simulation mode is to demonstrate the progression of one or more parameters within the argument model over a period of time. For example, if it is believed that a confidence value associated with a particular hypothesis will increase at a predictable rate, the simulation function can allow a user to estimate the length of time necessary for a desired level of confidence in the main hypothesis to be reached.

Several options are provided for controlling the progression of the editor through the simulation data. For example, a step forward command 606 allows the user to progress forward to the next state, and a step back command 608 allows the user to return to the previous state. A pause command 610 allows the user to halt the progression of the states, for example, to observe the effects of the state on the argument for a longer period of time. A continue command 612 allows the user to continue a paused simulation. A stop command 614 completely stops the progression of states until the simulation is restarted, and a clear command 616 clears the simulation data from the program and returns the parameter values of the argument to their appropriate values.

FIG. 13 illustrates a menu bar 650 from an exemplary structured argument editor having a fourth option selected in accordance with one or more aspects of the present invention. In the illustrated implementation, the fourth option 652 is a drop-down settings menu having one or more options allowing the user to change configuration data associated with the structured argument editor. A first option 654 allows the user to toggle an animation function within the editor between an "On" mode and an "Off" mode. In the "On" mode, when a subargument in collapsed into a child node, there is a brief animation of the collapsed nodes and connections flowing into the child node. When the animation is in the "Off" mode, the collapsed nodes and connectors in the subargument simply disappear. A second option on the menu is a preferences option 656. The preferences option 656 allows the user to open a preferences menu that allows one or more features within a configuration file to be modified. For example, the colors associated with various node types can be modified.

Figure 14:
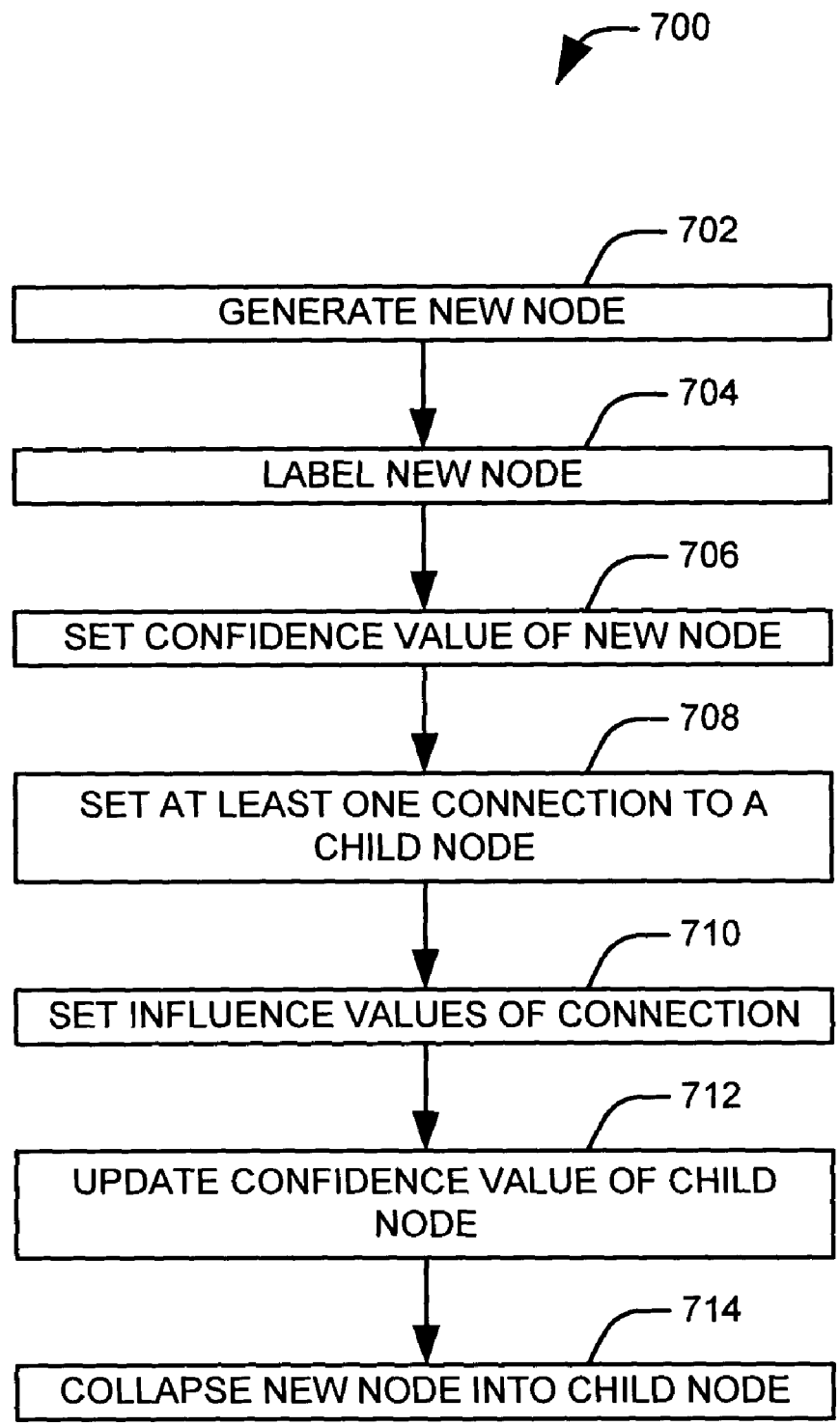
FIG. 14 illustrates a methodology for dynamically incorporating a new node into an argument model.
Figure 15:
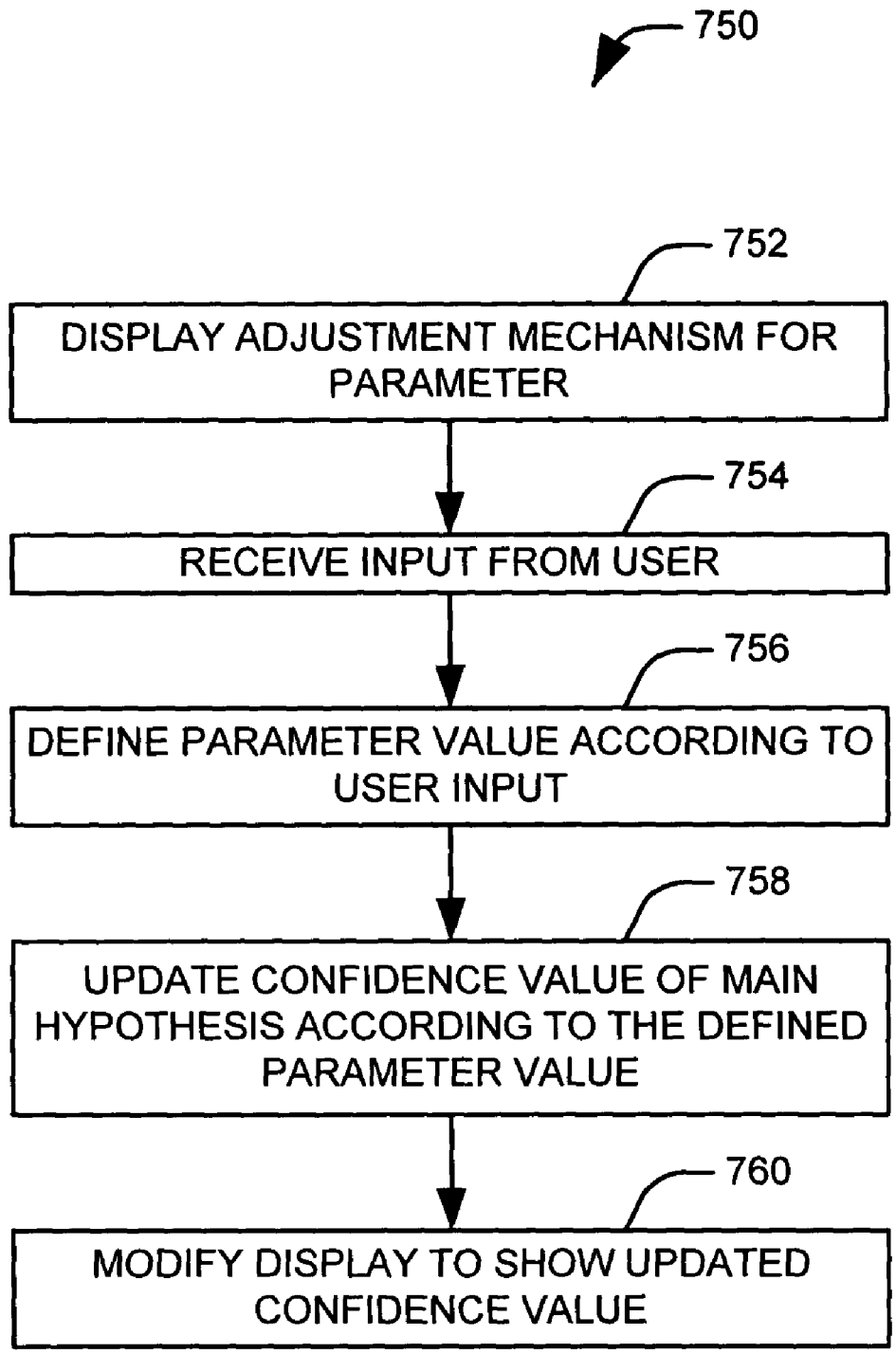
FIG. 15 illustrates a methodology for determining the sensitivity of an argument model to a particular parameter within the argument.

In view of the foregoing structural and functional features described above, methodologies in accordance with various aspects of the present invention will be better appreciated with reference to FIGS. 14-15. While, for purposes of simplicity of explanation, the methodologies of FIGS. 14-15 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 14 illustrates a methodology 700 for dynamically incorporating a new node into an argument model. It will be appreciated that the various functions described in the illustrated methodology are user initiated functions of the structure argument editor. Accordingly, the various functions can be instigated by the user in any logical order. Additionally, the listed functions are neither necessary nor exhaustive with respect to a method in accordance with the present invention. At 702, a new node is generated by the system in response to a user request. The new node is generated with a default confidence value and no connections to any other nodes. At 704, the node is labeled by the user. Generally speaking, the label of a node will correspond to the hypothesis it represents.

At 706, the user sets the confidence value of the new node. This can be entered numerically or set at a slider associated with the node. The appearance of the new node on a display can be modified to show the defined confidence value. This can include changing a numerical indicator associated with the node, changing the appearance of the node itself, or any similar indicator. At 708, the user connects the new node to a downstream node, such that the new node is a parent node of a downstream, child node. A connector will be displayed between the two nodes signifying the relationship between the two nodes.

At 710, the user selects an influence value for the connector. The selected influence value can determine the effect that the confidence value of the new node will have on the child node. For example, if a large, positive value for the influence value is selected, any increase in the confidence value of the new node can cause a relatively large increase in the confidence value of the child node. If a small, negative value is selected, any increase in the confidence value of the new node can cause a small decrease in the confidence value of the child node. The display is updated to show the effects of the influence value. For example, the width and color of the connector can be changed to show the magnitude and sign of the influence value. Similarly, the color of the new node can be altered to show that it has a net positive or a net negative effect on its child nodes.

At 712, the confidence value of the child node is updated according to the selected confidence value of the new node and the influence value of the connector. The impact of the new node on the child node is determined by a mathematical or statistical formula associated with the structured argument editor. For example, the confidence value of the child node can be the average or sum of the confidence values of its respective parent nodes weighted by their respective influence values. It will be appreciated, however, that the function relating the confidence values of the parent and child hypotheses can be any suitable mathematical function, including functions derived from Bayesian statistical theory. The appearance of the child node can be modified to show the updated confidence value. This can include changing a numerical indicator associated with the node, changing the appearance of the node itself, or any similar indicator. In an exemplary embodiment, the node has an associated color, and the saturation of the associated color is varied proportionally to the confidence value of the node.

At 714, the new node is collapsed into the child node. This allows the new node to retain its effect within the structured argument without adding to the visible complexity of the argument. Thus, the scale of the argument can be controlled, as extraneous nodes can be collapsed into nodes representing hypotheses of interest. Collapsed nodes can be expanded upon input from a user if the reasoning behind a particular hypothesis becomes of interest.

FIG. 15 illustrates a methodology 750 for determining the sensitivity of an argument model to a particular parameter within the argument. A structured argument editor is capable of updating argument parameters in real time in accordance with one or more aspects of the present invention. Thus, the sensitivity of an argument to a particular parameter can be determined by altering the parameter and observing the real time change in the displayed argument model.

To this end, at 752 the system displays an adjustment mechanism for a parameter of interest. The adjustment mechanism is intended to be continuous, such that a user can change the parameter in a smooth continuous manner. This allows the user to make multiple changes in a relatively short period of time and observe their effects on the structured argument. In an exemplary embodiment, the adjustment mechanism is a line graph, having a minimum and maximum value for the parameter, and a slider that allows the user to set a value within the available range.

At 754, input is received from the user through the adjustment mechanism. This input selects a parameter value desired by the user. At 756, the value of the parameter is defined to the user selected value in a system memory. At 758, the confidence value of the main hypothesis is updated to reflect the new value of the parameter. For example, if the parameter is a confidence value of a contributing hypothesis, changing the parameter can have an effect on the child nodes of the affected node. Once these values are updated, they, in turn, can affect their own respective child nodes. The effect can thus propagate to the main hypothesis, with the magnitude of the effect on the main hypothesis depending on the degree of separation between the affected node and the node representing the main hypothesis, as well as the various parameters, such as influence values, in between the two nodes. A similar effect can be observed when changing the influence value between two contributing nodes.

At 760, the display is updated to show the updated confidence value of the main hypothesis. In an exemplary embodiment, updated confidence values can also be shown for the nodes intermediate to the node or connector representing the parameter of interest and the main hypothesis. The display can be updated as either or both of a quantitative feature or a qualitative feature. For example, a quantitative feature can include a numerical indicator associated with the node. A qualitative feature can include appearance of the node itself, such as its shape, size, or color. In an exemplary implementation, the node has an associated color, and the saturation of the associated color is varied proportionally to the confidence value of the node. By observing the change of the displayed confidence value for the main hypothesis, the user can determine the magnitude of the change induced by the requested change to the parameter of interest.

Figure 16:
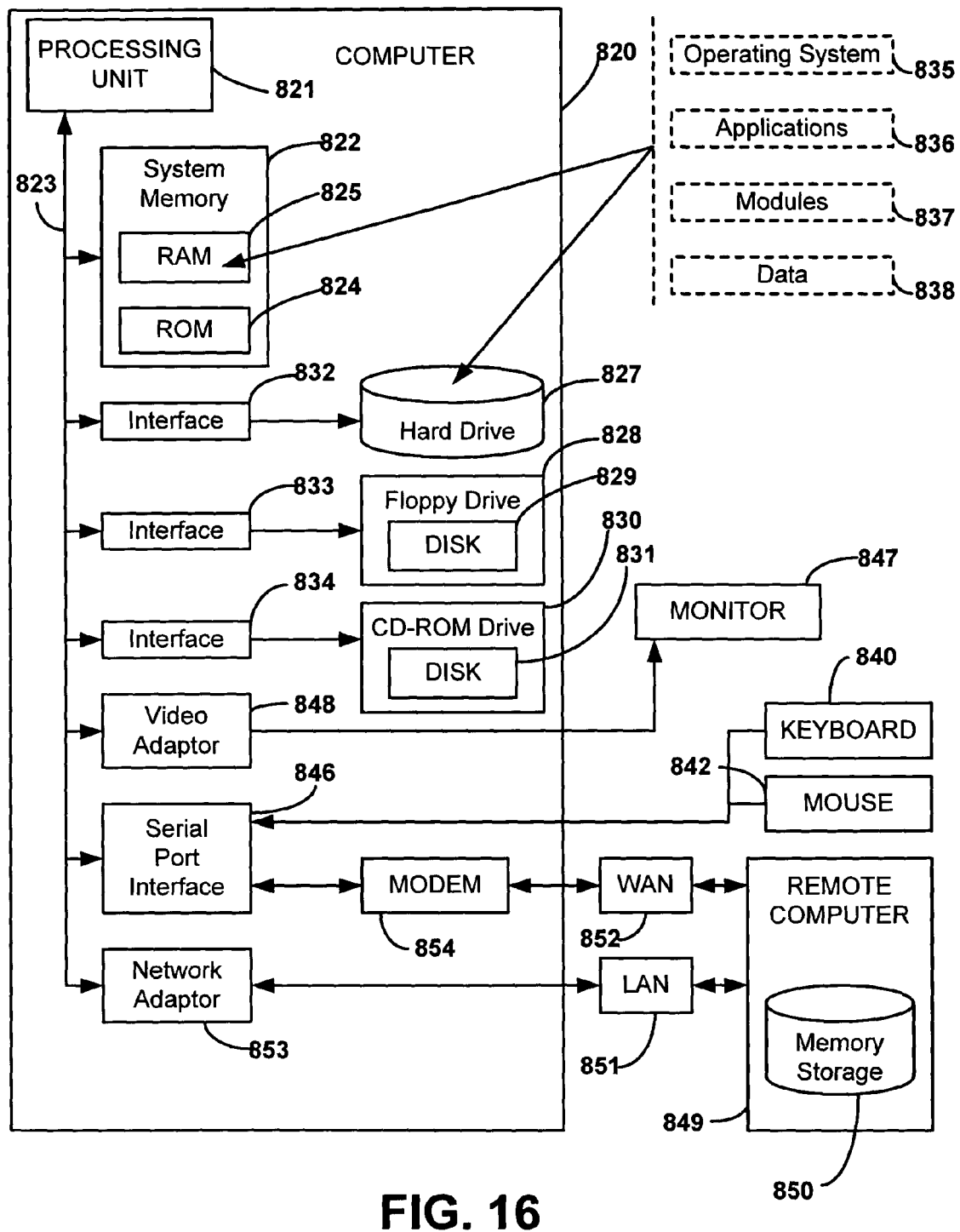
FIG. 16 illustrates a schematic block diagram of an exemplary operating environment for a system configured in accordance with the present invention.

In order to provide a context for the various aspects of the invention, FIG. 16 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

With reference to FIG. 16, an exemplary system for implementing the various aspects of the invention includes a conventional server computer 820, including a processing unit 821, a system memory 822, and a system bus 823 that couples various system components including the system memory to the processing unit 821. The processing unit may be any of various commercially available processors. Dual microprocessors and other multi-processor architectures also can be used as the processing unit 821. The system bus may be any of several types of bus structure including a memory bus or memory controller, a peripheral bus, and a local bus using any of a variety of conventional bus architectures. The system memory includes read only memory (ROM) 824 and random access memory (RAM) 825. A basic input/output system (BIOS), containing the basic routines that help to transfer information between elements within the server computer 820, such as during start-up, is stored in ROM 824.

The server computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the server computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 825, including an operating system 835, one or more application programs 836, other program modules 837, and program data 838. A user may enter commands and information into the server computer 820 through a keyboard 840 and a pointing device, such as a mouse 842. Other input devices (not shown) may include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The server computer 820 may operate in a networked environment using logical connections to one or more remote computers, such as a remote client computer 849. The remote computer 849 may be a workstation, a server computer, a router, a peer device or other common network node, and typically includes many or all of the elements described relative to the server computer 820, although only a memory storage device 850 is illustrated in FIG. 16. The logical connections depicted in FIG. 16 include a local area network (LAN) 851 and a wide area network (WAN) 852. Such networking environments are commonplace in offices, enterprise-wide computer networks, intranets and the Internet.

When used in a LAN networking environment, the server computer 820 is connected to the local network 851 through a network interface or adapter 853. When used in a WAN networking environment, the server computer 820 typically includes a modem 854, or is connected to a communications server on the LAN, or has other means for establishing communications over the wide area network 852, such as the Internet. The modem 854, which may be internal or external, is connected to the system bus 823 via the serial port interface 846. In a networked environment, program modules depicted relative to the server computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for editing and displaying a structured argument, having a plurality of associated parameters, the system comprising:

a processor operative to execute computer executable instructions; and a computer readable medium that stores the computer executable instructions, the computer executable instructions comprising:

a user interface that graphically displays the plurality of parameters at a user accessible display and receives input from a user defining the value of a selected parameter, wherein the plurality of parameters comprises respective confidence values for a plurality of hypotheses;

a computational engine that alters the selected parameter to the defined value, updates the plurality of parameters according to the defined value of the selected parameter, and provides the altered parameters to the user interface, such that the display is updated in real time to reflect the user input; and a simulation function that alters at least one parameter of the structured argument according to a predetermined series of values, representing changes in the at least one parameter over a period of time.

2. The system of claim 1, at least one confidence value being displayed to a user via a first, qualitative indicator and a second, quantitative indicator.

3. The system of claim 1, the plurality of hypotheses being displayed as colored nodes within a belief network, and the respective confidence values being represented as at least one of the brightness, hue, and saturation of the color of the node.

4. The system of claim 1, the plurality of parameters comprising a plurality of influence parameters, the influence parameters representing the degree of logical relatedness between respective associated first and second hypotheses.

5. The system of claim 1, the computer executable instructions further comprising a collapse node function that allows the structured argument to be scaled to a desired size.

6. The system of claim 1, the plurality of parameters defining an argument model.

7. The system of claim 3, the plurality of hypotheses comprising supporting, detracting, and neutral hypotheses, supporting hypotheses being associated with a first color, detracting hypotheses being associated with a second color, and neutral hypotheses being associated with a third color.

8. The system of claim 4, at least one influence parameter being displayed to a user via a first, qualitative indicator and a second, quantitative indicator.

9. The system of claim 4, the influence parameters being displayed as s connectors between respective first nodes, representing the associated first hypothesis, and respective second nodes, representing the associated second hypothesis, the magnitude of the influence parameter being represented by at least one spatial dimension of the connector.

10. The system of claim 6, the argument model being represented by a Bayesian belief network.

11. The system of claim 6, the argument model being represented by a Dempster-Shafer belief network.

12. The system of claim 6, the argument model being represented as an Extensible Mark-up Language (XML) schema.

13. A computer readable medium having stored executable instructions for determining the sensitivity of a hypothesis of interest to a parameter within an argument model, such that an associated processor executing the executable instructions performs a plurality of functions comprising:

providing a continuous mechanism for a user to modify the parameter, such that the user can make multiple modifications to the parameter in rapid sequence;

updating a confidence value associated with the hypothesis of interest in response to the modification of the parameter; and altering a display of the confidence value of the hypothesis of interest in real time to match the updated confidence value in response to each modification of the parameter, wherein the display of the confidence value comprises a qualitative display of the confidence value, such that a non-numerical quality of a node associated with the hypothesis of interest is altered to illustrate a change in the confidence value wherein the argument model comprises at least two contributing hypotheses, the parameter comprising an influence value associated with a logical relationship between the two contributing hypotheses, the influence value representing a degree of logical relatedness between the two contributing hypotheses.

14. The computer readable medium of claim 13, the non-numerical quality being the relative saturation of a color associated with the node.

15. The computer readable medium of claim 13, the display of the confidence value further comprising a quantitative display.

16. The computer readable medium of claim 13, the parameter comprising a confidence value associated with a contributing hypothesis within the structured argument.

17. The computer readable medium of claim 13, the continuous mechanism comprising a line graph, spanning a minimum influence value and a maximum influence value, and a slider for selecting a value on the line graph.

18. The computer readable medium of claim 13, the plurality of functions further comprising providing a predetermined series of values into the argument such that the at least one parameter is altered according to the predetermined series of values, the predetermined series of values representing changes in the at least one parameter over a period of time.

19. The computer readable medium of claim 16, the continuous mechanism comprising a line graph, spanning a minimum confidence value and a maximum confidence value, and a slider for selecting a value on the line graph.

20. A system for editing and displaying a structured argument, comprising a plurality of parameters, comprising:

means for storing the structured argument;

means for processing computer executable instructions and accessing the means for storing;

means for graphically displaying the plurality of parameters, each having an associated value, the means for displaying comprising means for scaling a displayed argument model to a desired size;

means for receiving input from a user, the input comprising a request to modify respective values of at least one selected parameter from the plurality of parameters;

means for modifying the values of the at least one selected parameter and at least one other parameter from the plurality of parameters;

means for altering at least one parameter of the structured argument according to a predetermined series of values as to represent changes in the at least one parameter over a period of time; and means for updating the modified parameter values and the means for displaying in real time in response to the user input.

21. The system of claim 20, the means for displaying comprising means for qualitatively displaying the value of the plurality of parameters and means for quantitatively displaying the value of the plurality of parameters.

22. A set of stored executable instructions stored in a computer readable medium that can be executed by an associated processor to edit and display a structured argument having a plurality of associated parameters, the executable instructions comprising:

a user interface that graphically displays the plurality of parameters, comprising:

respective confidence values for a plurality of hypotheses, at a user accessible display and receives input from a user defining the value of a selected parameter, wherein the plurality of hypotheses are displayed as colored nodes within a belief network, and the respective confidence values being represented as at least one of the brightness, hue, and saturation of the color of the node; and a plurality of influence parameters representing the degree of logical relatedness between respective associated first and second hypotheses, wherein the influence parameters are displayed as connectors between respective first nodes representing the associated hypotheses and respective second nodes, representing the associated second hypotheses; and a computational engine that alters the selected parameter to the defined value, updates the plurality of parameters according to the defined value of the selected parameter, and provides the altered parameters to the user interface, such that the display is updated in real time to reflect the user input.

23. A system for editing and displaying a structured argument, having a plurality of associated parameters, the system comprising:

a processor, operative to execute computer executable instructions; and a computer readable medium that stores the computer executable instructions, the computer executable instructions comprising:

a user interface that graphically displays the plurality of parameters, comprising a plurality of influence parameters representing the degree of logical relatedness between respective associated first and second hypotheses, at a user accessible display and receives input from a user defining the value of a selected parameter, wherein the influence parameters are displayed as connectors between respective first nodes, representing the associated first hypotheses, and respective second nodes, representing the associated second hypotheses, and the magnitude of a given influence parameter is represented by at least one spatial dimension of the associated connector of the influence parameter, wherein the plurality or parameters comprises respective confidence values for a plurality of hypotheses; and a computational engine that alters the selected parameter to the defined value, updates the plurality of parameters according to the defined value of the selected parameter, and provides the altered parameters to the user interface, such that the display is updated in real time to reflect the user input.

24. The system of claim 23, at least one confidence value being displayed to a user via a first, qualitative indicator and a second, quantitative indicator.

25. The system of claim 23, the plurality of hypotheses being displayed as colored nodes within a belief network, and the respective confidence values being represented as at least one of the brightness, hue, and saturation of the color of the node.

* * * * *